United States Patent [19]

Moddejonge

[11] Patent Number: 4,758,008
[45] Date of Patent: Jul. 19, 1988

[54] FOLDING TRAILER

[76] Inventor: Albertus Moddejonge, No. 37, Dotingastate, 8926 ML Leeuwarden, Netherlands

[21] Appl. No.: 34,423

[22] PCT Filed: Jul. 8, 1986

[86] PCT No.: PCT/NL86/00018
§ 371 Date: Mar. 4, 1987
§ 102(e) Date: Mar. 4, 1987

[87] PCT Pub. No.: WO87/00133
PCT Pub. Date: Jan. 15, 1987

[30] Foreign Application Priority Data

Jul. 8, 1985 [NL] Netherlands ............... 8501952

[51] Int. Cl.[4] .................................. B62D 63/06
[52] U.S. Cl. ........................... 280/37; 280/639; 280/656
[58] Field of Search .............. 280/40, 37, 656, 639

[56] References Cited

U.S. PATENT DOCUMENTS

| | | | |
|---|---|---|---|
| 1,409,787 | 3/1922 | Scarlett | 280/37 |
| 2,437,380 | 3/1948 | Cooklin et al. | 280/37 |
| 2,577,951 | 12/1951 | Cortsen | 280/37 |
| 3,073,615 | 1/1963 | Siewert | 280/37 |
| 4,175,768 | 11/1979 | Thackray | 280/656 |
| 4,239,258 | 12/1980 | Burris | 280/639 |
| 4,266,791 | 5/1981 | Myers | 280/37 |

Primary Examiner—Richard A. Bertsch
Attorney, Agent, or Firm—Mark Zovko

[57] ABSTRACT

In a folding trailer (1) comprising at least a bottom (2), two wheels (17) connected to the bottom by a wheel suspension, and a towing bar (7) for coupling the trailer to a tractive vehicle. The bottom comprises a central section (3) at the height of the wheels (17), a front and rear sections (5,4) each of which can be moved relatively to the central section (3) between a working position in which they lie in one plane with the central section and a folded position in which they lie parallel to each other and transversely to the central section. The wheel suspension (42) is shaped in such a way that the wheels (17) can be accomodated within the space defined in the folded state by the central section and the front and rear bottom sections.

7 Claims, 4 Drawing Sheets

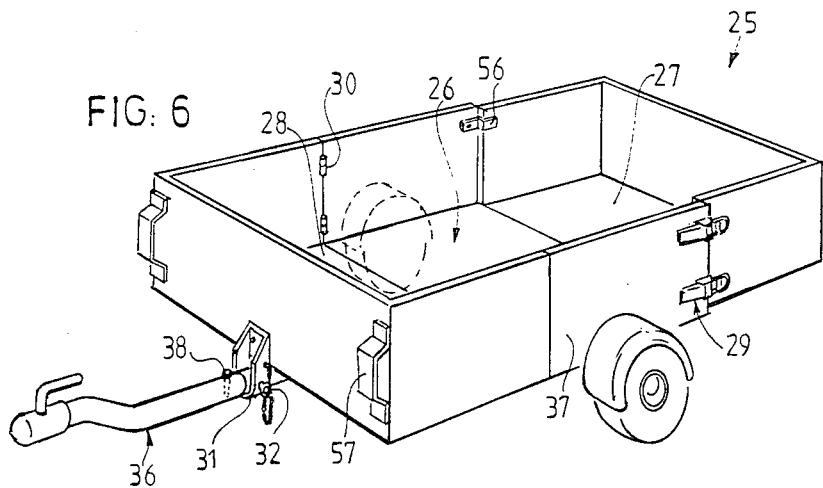
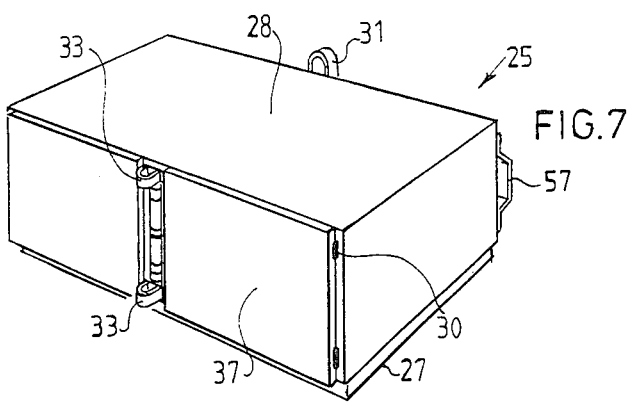

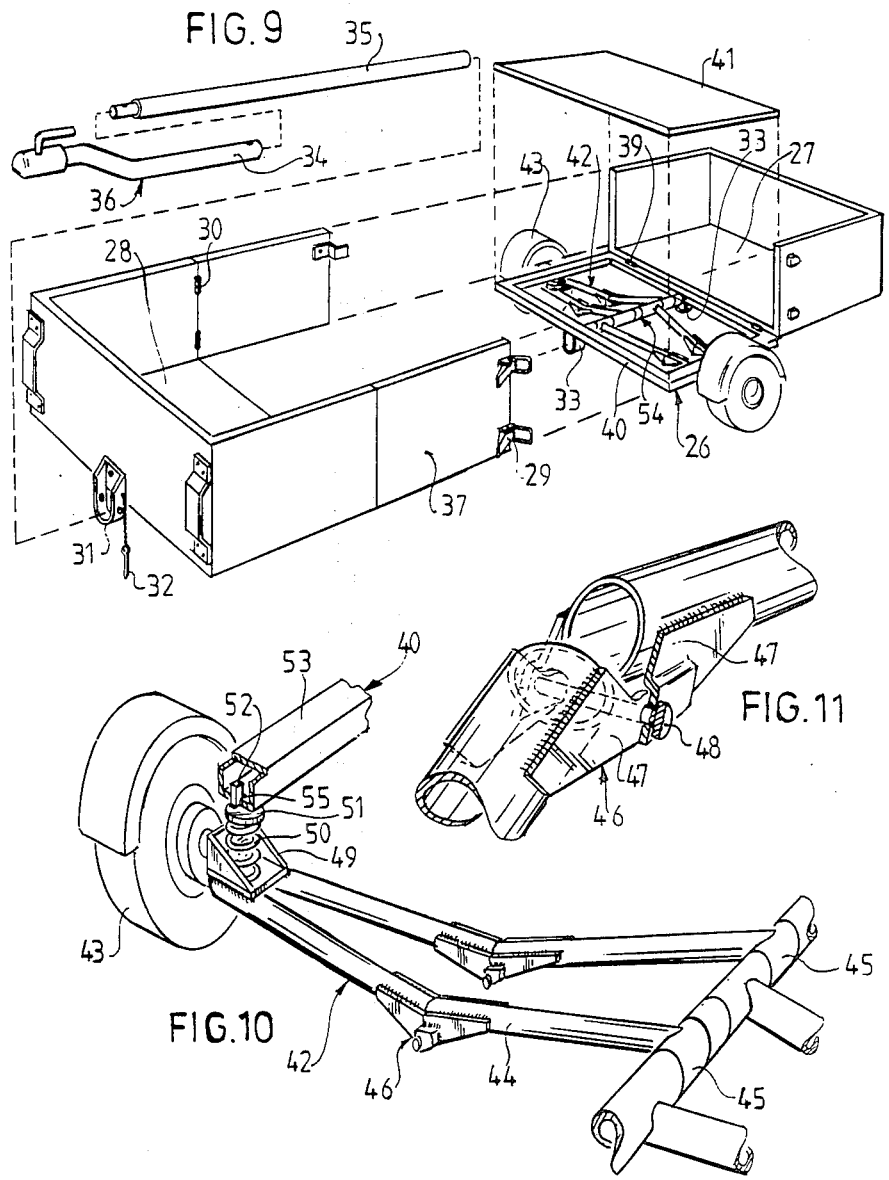

FOLDING TRAILER

The invention relates to a folding trailer comprising at least a base, two wheels connected to said base by a wheel suspension, and a shaft for coupling to a tractive vehicle, whereby said base comprises a central part at the point of said wheels and a front and rear part each of which can be moved relative to the central part between a position for use in which they lie in one plane with said central part and a folded position in which they lie parallel to each other and transversely to said central part. Such a folding trailer is known from U.S. Pat. No. 4,239,258. The front and rear base part can her be folded up together with the edge portions connected thereto so that in this folded position the length dimension of the trailer is considerably reduced. In this folded position the trailer therefore takes up little space and can for example still be placed in a garage against one of its inside walls.

The invention aims to provide a trailer of the type set forth above which takes up so little space in the folded state that it can for example be carried in the trunk of an automobile or put in a cupboard indoors.

This purpose is achieved with a folding trailer according to the invention in that said wheel suspension is given a form such that said wheels can be accommodated within the space defined in the folded state by said central part and the front and rear base parts. The outside dimensions of a trailer according to the invention are as a result only determined by the dimensions of the base parts. In the folded state the trailer has the form of a trunk, so that it can easily be put in the desired place.

A first embodiment of the invention is obtained when the wheels are arranged underneath in vertical direction within the outer periphery of the central part and the front and rear part are connected with said central part so as to fold downwards. This embodiment has the advantage that the wheel suspension can be very simple so that the cost of such a trailer according to the invention can be low.

This embodiment of the trailer according to the invention can, in accordance with a further development, have a construction in the form of a container if vertical edge portions are arranged for pivoting on the outer edges of the front, central and rear parts. In the folded position of the trailer the edge portions pivot against the respective base parts so that the total space taken up becomes only a very little greater.

Another embodiment of the invention is obtained when the front and the rear part are connected for folding with the central part, the central part comprises a window-like frame and that the wheel suspension is given a form such that the wheels can be swung inwards through said frame. This trailer is preferably given a form such that the wheel suspension for each wheel comprises a transverse supporting arm mounted for pivoting close to the middle of the central part, which arm can be bent at an intermediate point. A relatively simple wheel suspension is hereby obtained which fulfils the requirement that the wheels can hereby be folded within the trunk form as well as the requirements that are set for obtaining a good road holding of the trailer. In the position for use the wheels can have a larger track width than the width of the trailer. The wheel suspension can moreover be given a form with a suitable springing.

If according to a further development of the invention vertical edge portions are connected firmly with the outer edges of the front and rear base part and the outside dimensions of the combination of one of the front or rear parts with its edge parts are chosen so as to be smaller than the corresponding inside dimensions of the other combination, the one combination can be accommodated in the other combination in the folded position. The front and rear parts can in this way each form a constructively strong whole.

The invention will be further explained in the following description of embodiments thereof with reference to the accompanying drawings.

FIG. 6 shows in perspective view another embodiment of the trailer according to the invention in the position of use.

FIG. 7 shows the trailer from FIG. 6 in the folded state.

FIGS. 8 and 9 are perspective views showing the dismantled parts of the trailer from FIG. 6 in respectively the folded up and folded out positions.

FIG. 10 shows in partly perspective view the wheel suspension of the trialer from FIG. 6.

FIG. 11 is a detail of the wheel suspension from FIG. 10.

Figure 1:
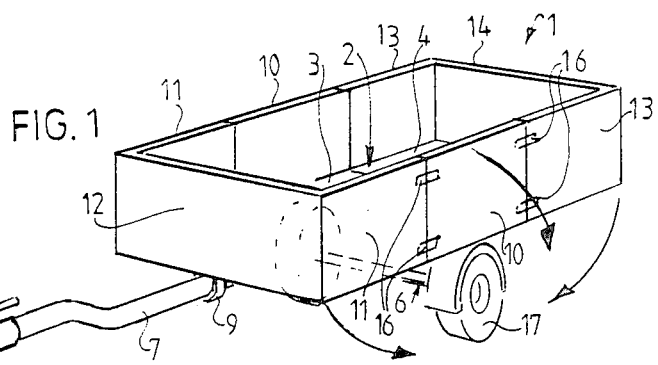
FIG. 1 shows a perspective view of a first embodiment of the trailer according to the invention.

The folding trailer 1 according to the invention comprises a base 2, wheels connected to the base 2 by a wheel suspension 6 and a shaft 7. Trailer 1 can be coupled by means of the coupling 8 on shaft 7 with a tractive vehicle. The shaft 7 is linked to base 2 of trailer 1 by means of a clamping brace 9.

The base 2 consists of a central part 3, a rear base part 4 and a front base part 5. The rear and front base part are connected to the central part by hinges 15.

FIG. 1 shows trailer 1 in the position of use, whereby the base parts 3, 4, 5 lie in one plane. According to the invention the trailer 1 can be folded such that the wheels 17 are accommodated inside the space defined in the folded position by the central part 3 and the front and rear base parts 5, 4.

In trailer 1 this is achieved in that the wheels 17 are arranged underneath and in vertical direction inside the outer periphery of central part 3 and the front part 5 and the rear part 4 of the base can be folded downwards.

Vertical edge portions are arranged for pivoting on the outside edges of the front, central and rear parts, so that in the position of use the trailer 1 has the form of a container. It is locked into the position of use by means of tensioning clamps 16 with which the side edge portions 11,10 and 13 are locked into a rigid whole on both sides of the trailer.

Figure 2:
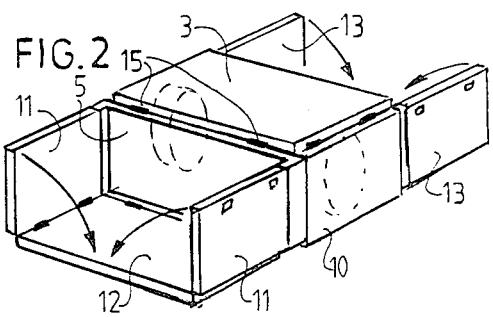
FIGS. 2, 3 and 4 show the trailer from FIG. 1 in various stages during folding.

The folding of the trailer 1 proceeds as follows:

The clamping brace 9 is released, whereby the shaft can be removed. Tensioning clamps 16 are then disconnected, wehreby the front base part with the side edge portions 11 and the front edge portion 12 connected to it can be swung downwards, the side edge portions 10 connected to the central part 3 can pivot downwards, and the rear base part 4 with the side edge portions 13 and the rear edge portion 14 connected to it can likewise be swung downwards. As a result the position shown in FIG. 2 is reached.

Figure 3:
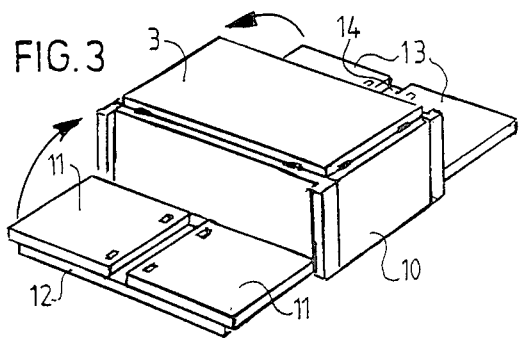
Figure 4:
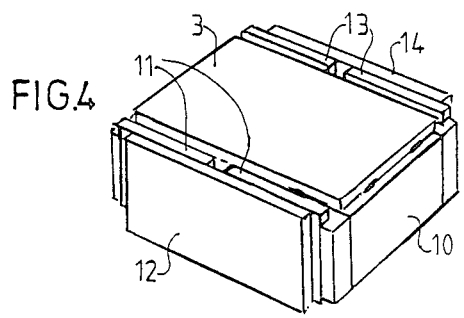

The side edge parts 11 and 13, which are connected for pivoting with respectively the front edge portion 12 and the rear edge portion 14, are then folded inwards (FIG. 3) and front edge portion 12 and rear edge part 13 are folded upward (FIG. 4). Thus is obtained the trunk form of very small dimensions shown in FIG. 4. The trunk shape is fixed with suitable tensioning clamps (not shown). Furthermore, handles can be placed at appropriate points, at which the folded trailer can be lifted up.

Figure 5:
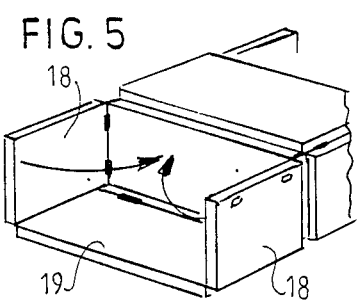
FIG. 5 shows a view of another embodiment corresponding with FIG. 2.

It will be apparent that particularly the hinge connections of the side edge portions and front and rear edge portions can be formed simply in another manner. FIG. 5 shows such an alternative embodiment, whereby the side edge portions 18 connected to the front base part and the front edge portion 19 are each coupled pivotally with the front base part.

The trailer 25 as shown in FIGS. 6–11 is of an embodiment where front part 28 and rear part 27 are connected to central part 26 so as to fold upwards, whereby the central part comprises a window-like frame 40 and the wheel suspension 42 takes a form such that the wheels 43 can pivot inwards through frame 40. In the trailer 25 the upright edge portions are connected as one whole to respectively the front base part 28 and rear base part 27. The thus formed front and rear containers can be made in a suitable manner in a sandwich construction so that they are light but strong.

The vertical edge portions 37 located on the central part 26 are connected by means of hinges 30 to the front part 28. Side portions 37 can be coupled firmly to the rear part 27 by means of tensioning clamps 29 so that the whole container forms a rigid whole.

The shaft 36 consists of a foremost shaft part 34 and a rear shaft part 35 which are coupled to each other with a locking pin 38. In the position of use shown in FIGS. 6 and 9 the shaft 36 is placed through a brace 31 on the front part 28 and two braces 33 fitted on the frame 40 of the central part. Using locking pin 32 the shaft is fixed into the foremost brace 31. Shaft 36 can further be clamped into one or each of the braces 33 in a manner not shown.

As FIG. 9 shows, the central part 26 comprises the previously mentioned window shaped frame 40 and a base plate 41 placed on it in the position of use. To fold the trailer 25 base plate 41 is detached from frame 40. The wheel suspension 42 comprises for each wheel 43 a transverse supporting arm 44 which is mounted by means of bearings 45 on a shaft 54 arranged in the middle of frame 40. Flexible joints 46 are located at an intermediate point in the transverse supporting arm 44 making the transverse supporting arm able to bend. As is shown particularly in FIG. 8 wheels 43 can as a result pivot, together with the wheel supporting arm which bends at the point of flexible joints 46, inwards through the frame 40 into the folded trailer.

As is shown in FIG. 11, flexible joint 46 is formed by hinge plates 47 fitted on either side of parts of the supporting arm 44 formed by tubes, which plates are connected for pivoting with each other by means of a pin 48 arranged through holes therein.

At the end close to the wheel 43 the supporting arm 44 is provided with a bracket 49 to which a helical spring is firmly mounted. On the upper side the helical spring 50 carries a spring cup 51, on the top of which protrudes a square pin 52. This pin 52 can be accommodated in a square hole 55 in the part 53 of frame 40. In the position of use pin 52 is fixed in hole 55 by means of a locking pin or the like (not shown).

Figure 8:
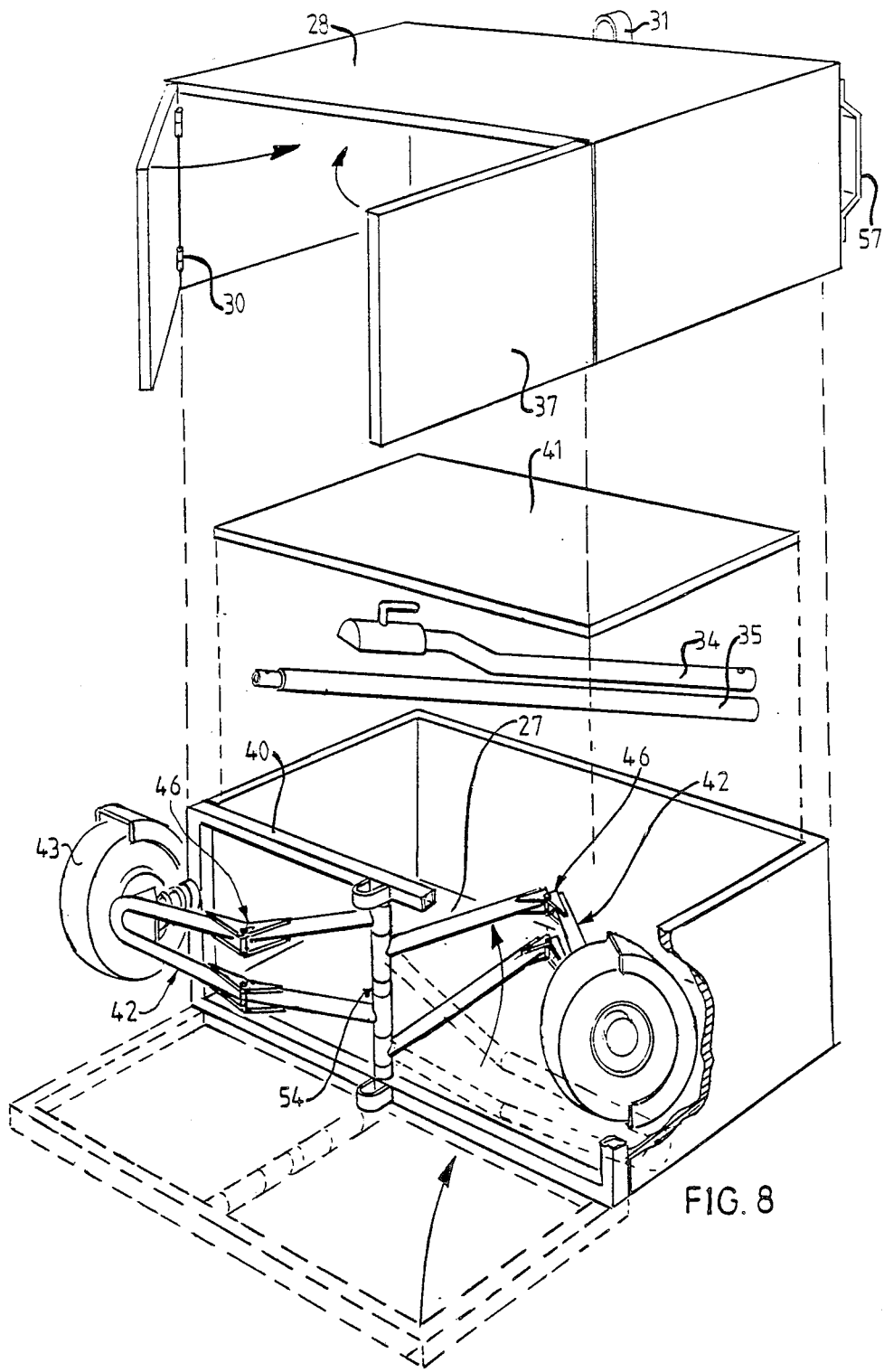

As is clearly shown in FIG. 6, the exterior dimensions of the rear base part 27 with its upright edge portions connected firmly to it are chosen so as to be smaller than the corresponding interior dimensions of the base part 28 with its upright edge portions. In the folded state of trailer 25 as shown in FIGS. 7 and 8 the rear combination can as a result be accommodated inside the front combination.

The folding of the trailer 25 from the position of use shown in FIG. 6 to the folded state shown in FIG. 7 proceeds as follows. Base plate 41 is first detached from the central part. The tensioning clamps 29 are then released and the rear part is pivoted downwards on hinges 39 until its rear edge rests on the ground. The side wall portions 37 are subsequently pivoted slightly outwards such that the braces 56 visible in FIG. 6 can pass on the outside of the rear container. The central part 26 and the front part 28, which are still coupled to each other by shaft 36 as a rigid whole, are then swung upwards on hinges 39 until the central and front parts stand straight on end. In this position the wheel suspension 42 can be detached at the point of the spring cup 51 and be swung inwards through the window shaped frame 40 into the inner space of the rear container. The shaft 36 is then detached and taken apart. These shaft parts 34 and 35 and the base plate 41 are placed in the rear container, following which the front part is pivoted backwards over the rear container. The side edge portions 37 are pivoted on hinges 30 against the underside of frame 40.

Members (not shown) are fitted to the trailer 25 to secure the whole in the folded position. The folded trailer 25 can now be lifted up by the handles 57 and put or stored away in a suitable place.

A trailer 25, which in the position of use has a container of for example 1.5 m long and 0.90 m wide, can in this way be folded into a trunk shaped whole that can be easily placed in the baggage space of an automobile or can be stored in a storage area.

I claim:

1. A folding trailer having a shaft for coupling to a tractive vehicle and two wheels for supporting the trailer comprising
   a. a base having a front portion, a rear portion and a central portion, said central portion being at least equal in length in the longitudinal direction relative to the trailer as the diameter of the wheels, said front portion and said rear portion connected to said central portion so as to allow movement of said front portion and said rear portion relative to said central portion from a first use position wherein said front portion, rear portion and central portion form a single plane to a second folded position in which the front portion and rear portion lie parallel to each other and transverse to said central portion; and
   b. wheel suspension means connected to said central portion and connected to and supporting said wheels, said wheel suspension means of a predetermined form such that the wheels of the folding trailer are within the space defined by said front portion, rear portion, and central portion of the base when said front portion, rear portion, and central portion are in the second folded position.

2. The folding trailer of claim 1 wherein the wheels are aligned in a vertical direction within the outer periphery of said central portion of the base when said front portion, said rear portion and said central portion are in the first use position.

3. The folding trailer of claim 1 wherein said front portion, said rear portion and said central portion of said base have edge portions vertically arranged when said front portion, said rear portion and said central portion are in the first use position, said edge portions pivotally connected to the outer edges of said front portion, said rear portion, and said central portion of said base.

4. A folding trailer having a shaft for coupling to a tractive vehicle and two wheels for supporting the trailer comprising:
  a. a base having a front portion, a rear portion and a central portion, said rear portion pivotally connected to said central portion, said central portion having a length in the longitudinal direction relative to the trailer at least as great as the diameter of the wheels and having a frame structure with an aperature within the frame structure; and
  b. wheel suspension means connected to said central portion of said base, said wheel suspension means adapted to allow the wheels to be swung inward through the aperature in the frame structure of said central portion of said base when the trailer is folded.

5. The apparatus of claim 4 wherein said wheel suspension means includes a transverse supporting arm supporting each wheel, said transverse supporting arm mounted substantially at the middle of said central portion, said transverse supporting arm being bendable at a point between the wheel and the center of said central portion of said base.

6. The folding trailer of claim 5 wherein said front and rear portions of said base have vertical edge portions which are firmly connected with the outer edges of said front and rear portions of said base, and that the outside dimensions of the combination of one of said front portion or said rear portion of said base with its vertical edge portion are predetermined so as to be smaller than the corresponding inside dimension of the other combination of said front portion or said rear portion of said base with its vertical edge portion.

7. The folding trailer of claim 4 wherein said front and rear portions of said base have vertical edge portions which are firmly connected with the outer edges of said front and rear portion of said base, and that the outside dimensions of the combination of one of said front portion or said rear portion of said base with its vertical edge portions are predetermined so as to be smaller than the corresponding inside dimensions of the other combination of said front portion or said rear portion of said base with its vertical edge portions.

* * * * *